Nov. 5, 1963   J. RIEPL ETAL   3,109,392
PROCESS FOR TREATING AND BURNING REFUSE
Filed June 30, 1960
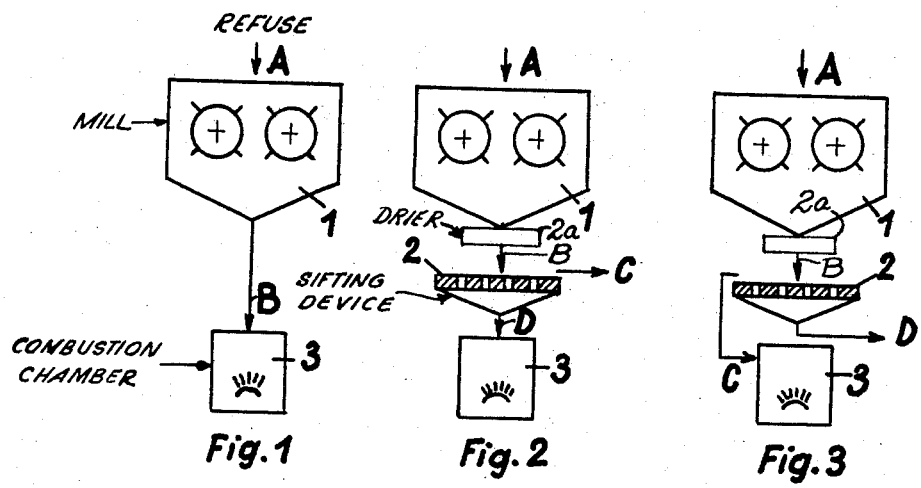
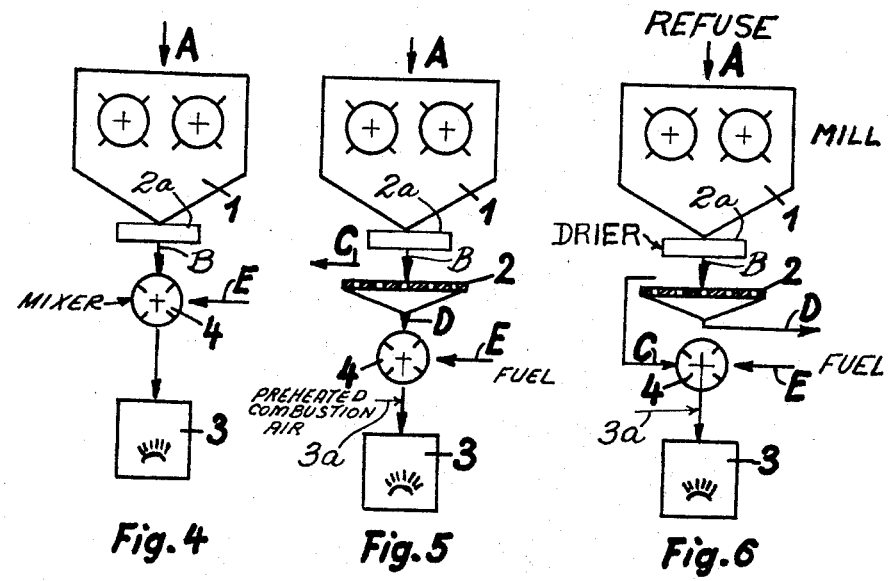
INVENTORS
Josef RIEPL
Fritz SCHERER
Erich O. RIEDEL
BY
Richards & Geier
ATTORNEYS 3,109,392
PROCESS FOR TREATING AND BURNING REFUSE
Josef Riepl, Prinzenstrasse 13, Munich, Germany, Fritz Scherer, Karwendelstrasse 16, Garmisch-Partenkirchen, Germany, and Erich O. Riedel, Flurstrasse 12-14, Gruiten, near Mettmann, Germany
Filed June 30, 1960, Ser. No. 39,881
Claims priority, application Germany June 30, 1959
3 Claims. (Cl. 110—8)

This invention relates to a process for treating and burning refuse.

Inhabited communities are now continuously increasing and constantly uniting in a comparatively small space, with the result that the problem of removing refuse of these communities, to which can be also added purely industrial refuse, is becoming more and more acute. Methods suggested for this purpose which are partly in actual use, either change the refuse into manure or destroy it by fire. The manure treatment has the consideration that it produces economically usable products. However, from the point of view of hygiene, destruction by fire should be the only correct procedure. Both methods can be combined with the sifting of refuse to save contents which are still usable. Some times, this selection takes place by itself; in such cases a large part of the refuse is thrown off into hollow spaces or upon dumps. However, this process is detrimental from a hygienic point of view. Its use is liable to become more and more limited since workers required for this unhygienic manual sifting are less and less available and since, on the other hand, values of the sifted products have the tendency of becoming smaller and smaller.

The present invention is based in part of the consideration that beside the sifting of metals which can be carried out mechanically and magnetically, the remaining substances should be burnt in an advantageous manner. However, the burning methods carried out so far are entirely uneconomical. Even the most modern combustion plants require considerable additions of fuel per ton of the material being burnt. One of the reasons for this resides in the type of combustion used, since the existing installations bring the refuse as it is, or at best, with a limited sifting process into the combustion chamber, whereby according to experience, considerable difficulties may arise to burn the non-homogeneous material. The temperatures obtained in these installations and the heat units of the fuel gases which are changed into steam do not permit an economical utilization of highly tensioned steam, such as steam having a pressure over 50 atmospheres. Therefore, modern industrial boilers which can advantageously produce higher tensioned steam, such as melting chamber boilers and cyclone boilers, are not used for refuse. The usual combustion plants for the burning of garbage operate with special travelling grates, and therefore, cannot be charged at will, so that for example, an operation entirely without garbage cannot be carried out in the plant without danger.

However, such plants would be in position to produce economically, steam with a high energy content if they were supplied with refuse of suitable form.

An object of the present invention is to eliminate the drawbacks of prior art methods and to create an economical and advantageous process for treating and burning communal and industrial refuse.

Other objects of the present invention will become apparent in the course of the following specification.

In accordance with the present invention, the refuse which is non-homogeneous from the point of view of its contents as well as its form, as it is obtained from inhabited communities and industrial installations, is changed into a more uniform product suitable for combustion by grinding the refuse in a suitable manner. The purpose of this grinding is the comminution of hard components and the tearing of soft components. To avoid damage to the grinding apparatus, it is possible to include in this process the usual preliminary classification of the substances to be ground.

It is a matter of general knowledge that refuse of inhabited communities consists of a mixture of many things, including metal, glass, rags, leather, paper, cardboard, bones, ashes, slag, coke, coal particles and organic residues which include particles of meat, fruit, vegetables, grass etc. The above mentioned preliminary classification consists of the removal of larger objects, such as frames and trunks, and the withdrawal of metallic parts by magnets. The ground material consists of a mixture of hard parts of low heating value which are capable of being comminuted, such as glass and bones, and soft parts of high heating value which are capable of being torn into fibers, such as the above mentioned organic residues, rags, paper and the like.

The combustion material produced in this manner has an entirely different combustion characteristic from the usual material supplied to combustion installations for garbage. The separation of the refuse into small and smallest possible particles makes it possible to use nozzle injection or to bring it into the combustion chamber along with air, with combustible air, or with fuel, or without any additional substances. The material to be subjected to combustion, which is now comminuted and is more uniform will be quickly enclosed and penetrated by the firing gases and the combustion air similar to coke dust firing. The material is easily burnt and ignited and it can be conveniently burnt in modern boilers whereby temperatures above 1500° C. can be used. These high temperatures melt the ashes of the combusted material, such remainder is a molten product as compared, on the other hand, to the slag products of existing plants for burning refuse.

In accordance with the present invention, it is of extremely great importance that by the melting process at high temperatures no more organic components can be present in the cinder. This completely eliminates in the process of the present invention, the usual objections from a hygienic point of view to plants for burning garbage and to the residues thereof.

Practical experience has shown that the ground refuse by a simple classification can be separated into two products which are entirely different from a combustion technical point of view. The smaller particles provide the part of the refuse which has a low heating value, since they are produced from the hard components of the refuse; a portion of high heating value is formed of larger particles which are usually derived from paper or cellulose components of the refuse. This possibility of dividing the refuse is most important since it permits a many sided and also extremely adaptable operation of a combustion plant of high efficiency. In principle, it is possible to burn only that part which has a high heating value and to use in other ways the part consisting of hard particles, when the latter is rich in ashes. However, as a rule, both component parts are treated in the combustion chamber.

The invention will appear more clearly from the following detailed description when taken in connection with the accompanying drawing showing by way of example, preferred embodiments of the inventive idea.

In the drawing:

FIGURES 1 to 6 are diagrams, each of which illustrates a different embodiment of the process of the present invention.

FIGURE 1 shows a mill 1 which receives garbage A. The ground refuse is transmitted to a combustion chamber 3 which may consist of a steam boiler.

FIGURE 2 shows the introduction of the garbage A into a mill 1 whereby after passing through a drier 2a the high heat value portion C is removed from the ground refuse B by means of a sifting device 2. The drier 2a may be of any suitable construction known in the art and is used to dry the ground refuse to a uniform water content. The operation of the sifting device may be set so that the hard particles will drop therethrough, while the larger fibers will remain thereon and may be removed by any suitable means. The portion D which has a low heat value is introduced into the combustion chamber 3.

FIGURE 3 illustrates the process wherein the garbage A is introduced into the mill 1 and the ground substance B after passing through the drier 2a is separated by the device 2 into a portion C having a high heat value which is burnt in the combustion chamber 3. On the other hand, the portion D having a low heat value is removed.

FIGURE 4 shows the introduction of the garbage A into a mill 1, whereby the comminuted mixture B after passing through the drier 2a is introduced into a mixer 4 wherein a fuel, which may be coal, oil or gas, is introduced into the mixer. Then the mixture is introduced into the combustion chamber 3.

FIGURE 5 illustrates the process, wherein the garbage A is treated in the mill 1 and the resulting ground mixture B after passing through the drier 2a is separated by the sifter 2 into the portion C of high heat value and the portion D of low heat value. The portion C is removed while the portion D is introduced into a mixer 4 wherein a fuel is added thereto. Preheated combustion air is introduced at 3a by any suitable means known in the art. Then the resulting mixture is supplied to the combustion chamber 3.

FIGURE 6 shows a similar procedure, wherein the garbage A is treated in the mill 1 to produce a mixture B which after passing through the drier 2a is then separated by the sifter 2 into a high heat value portion C and a low heat value portion D. However, in this case, the portion D is removed while the portion C is introduced in a mixer 4, wherein a fuel E is added thereto. Preheated combustion air is introduced at 3a by any suitable means known in the art. Then the mixture is introduced into the combustion chamber 3.

It is apparent that only by means of the process of the present invention, it is possible to supply ground refuse uniformly with fuel. This is impossible to carry out economically in the case of untreated garbage due to the large component parts which are unsatisfactory from the point of view of combustion technique. The advantageous mixing facilities make it possible to mix solid, liquid or gaseous fuels with the comminuted refuse before it is introduced into the combustion chamber or in the combustion chamber itself; thus even when the heat value is low from the point of view of obtaining the melting of the garbage, the melting point of the mixture can be reached safely and easily through the addition of fuel. Furthermore, it is possible to add so much of the known fuels that an economically advantageous operation is secured which is comparable to that of a modern high efficiency boiler. In that case, the comminuted refuse serves solely as an economical additional fuel. The additional fuel thus obtained will become more and more important since the heating values of existing refuse continuously increase with the progress of industrialization and modernization of life in inhabited communities.

The waste heat produced in the steam boiler operation can be utilized in the usual manner for pre-heating the combustion air or for preliminarily drying the combustion material. The cinder thus obtained is advantageously quenched in water, liquid, air or by a spray of these means so as to produce granulated cinder which can be used for many purposes and which may provide additional economical values.

The present invention makes it possible to burn refuse of inhabited communities or industrial refuse in modern boiler installations at temperatures and conditions which assure the formation of cinder. Furthermore, conditions are created which make it possible to obtain steam with any desired heat content. Thus, the requirements for the economical operation of a garbage burning installation which remained unfulfilled heretofore, are now fully provided and the requirements of hygienic treatment as well as of hygienic end products are assured.

It is apparent that the examples shown above have been given solely by way of illustration and not by way of limitation and that they are subject to many variations and modifications within the scope of the present invention. All such variations and modifications are to be included within the scope of the present invention.

What is claimed is:

1. A process for producing a fuel from communal and and industrial refuse, said process comprising, in combination, the steps of grinding the refuse by tearing and comminuting it, drying the refuse, separating it into a comparatively hard component part of low heat value and a comparatively soft component part of high heat value, mixing at least one of said component parts with a separate fuel to produce a fuel mixture of substantially uniform and adequately high heating value sufficient for burning purposes, and then burning the fuel mixture.

2. A process for producing a fuel from communal and industrial refuse, said process comprising, in combination, the steps of grinding the refuse by tearing and comminuting it, drying the refuse, separating it into a comparatively hard component part of low heat value and a comparatively soft component part of high heat value, mixing at least one of said component parts with a separate fuel, the amount of fuel admixed to said one component part being such that the resulting mixture will burn at a temperature higher than 1500° C., and then burning the mixture at said temperature.

3. A process for producing a fuel from communal and industrial refuse, said process comprising, in combination, the steps of grinding the refuse by tearing and comminuting it, drying the refuse, separating it into a comparatively hard component part of low heat value and a comparatively soft component part of high heat value, mixing at least one of said component parts with a separate fuel to produce a fuel mixture of substantially uniform and adequately high heating value sufficient for burning purposes, introducing preheated combustion air into the fuel mixture and burning the fuel mixture.

References Cited in the file of this patent

UNITED STATES PATENTS

| | | |
|---|---|---|
| 425,603 | Fleischman | Apr. 15, 1890 |
| 479,405 | Delanoy | July 26, 1892 |
| 1,244,952 | Bryan et al. | Oct. 30, 1917 |
| 1,454,082 | Schlosser | May 8, 1923 |
| 1,936,810 | Upson | Nov. 28, 1933 |
| 2,066,418 | O'Mara | Jan. 5, 1937 |
| 2,200,677 | Peterson | May 14, 1940 |
| 2,399,884 | Noack | May 7, 1946 |
| 2,879,726 | Ferris et al. | Mar. 31, 1959 |